United States Patent [19]

Tsuda

[11] 4,194,243

[45] Mar. 18, 1980

[54] DATA PROCESSING SYSTEM HAVING PORTIONS OF DATA ADDRESSING AND INSTRUCTION ADDRESSING INFORMATION PROVIDED BY A COMMON SOURCE

[75] Inventor: Toshitaka Tsuda, Kawasaki, Japan

[73] Assignee: Fujitsu Limited, Japan

[21] Appl. No.: 787,494

[22] Filed: Apr. 14, 1977

[30] Foreign Application Priority Data

Apr. 30, 1976 [JP] Japan .................................. 51-49494

[51] Int. Cl.$^2$ ............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,914,746 | 10/1975 | Steinmetz et al. | 364/200 |
| 3,936,803 | 2/1976 | Katzman et al. | 364/200 |
| 3,962,682 | 6/1976 | Bennett | 364/200 |
| 3,975,712 | 8/1976 | Hepworth et al. | 364/200 |
| 3,984,670 | 10/1976 | Erickson et al. | 364/200 |
| 3,984,813 | 10/1976 | Chung | 364/200 |
| 3,990,052 | 11/1976 | Gruner | 364/200 |
| 4,014,006 | 3/1977 | Sorensen et al. | 364/200 |

OTHER PUBLICATIONS

Lyon, R. F. "Two's Complement Pipeline Multipliers" IEEE, Transactions on Communications, vol. 24, No. 4, Apr., 1976.

*Primary Examiner*—Melvin B. Chapnick
*Attorney, Agent, or Firm*—Staas & Halsey

[57] ABSTRACT

A data processing system for reading or writing data comprises a data memory unit and a processing unit, the data to be read from or written to the data memory unit is being serially transferred bit by bit over a single line connected between the data memory unit and the processing unit. The processing unit is operated in accordance with an instruction specified by instruction addressing information which is produced by an instruction counter. The data is specified by data addressing information which is produced by a means for specifying the address of the data memory unit. Both the lower bits of the data addressing information and the lower bits of the instruction addressing information are jointly produced by the lower bit stages of the instruction counter. The upper bits of the data addressing information are momentarily stored in an upper bits specifying register during one read or write operation while one execution of one data bit data is performed. Further, the data addressing information is provided synchronously with the provision of the instruction addressinginformation. The number of bits of the data word must be equal to or must be a multiple of the number of bits of the instruction word, or the number of bits of the instruction word must be a multiple of the number of bits of the data word.

21 Claims, 13 Drawing Figures

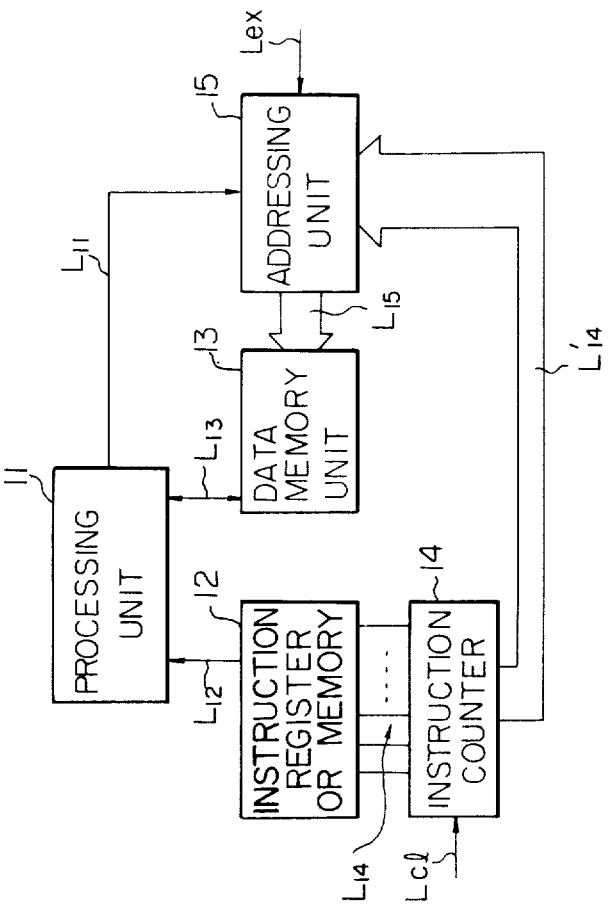

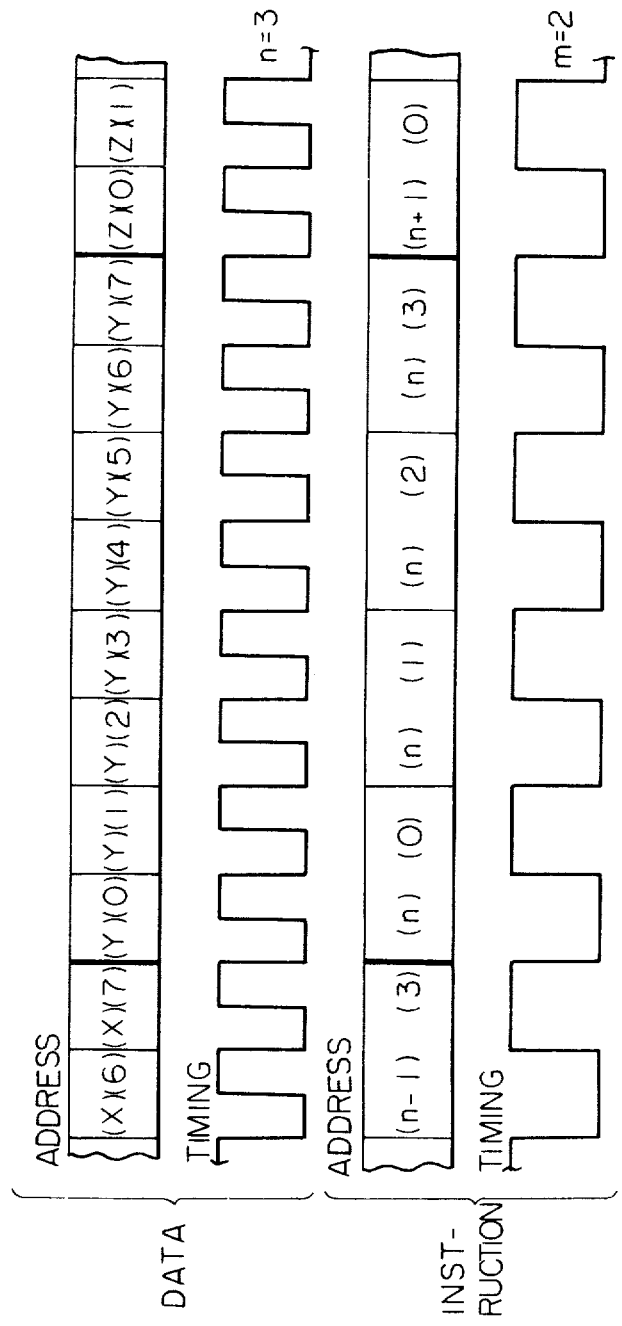

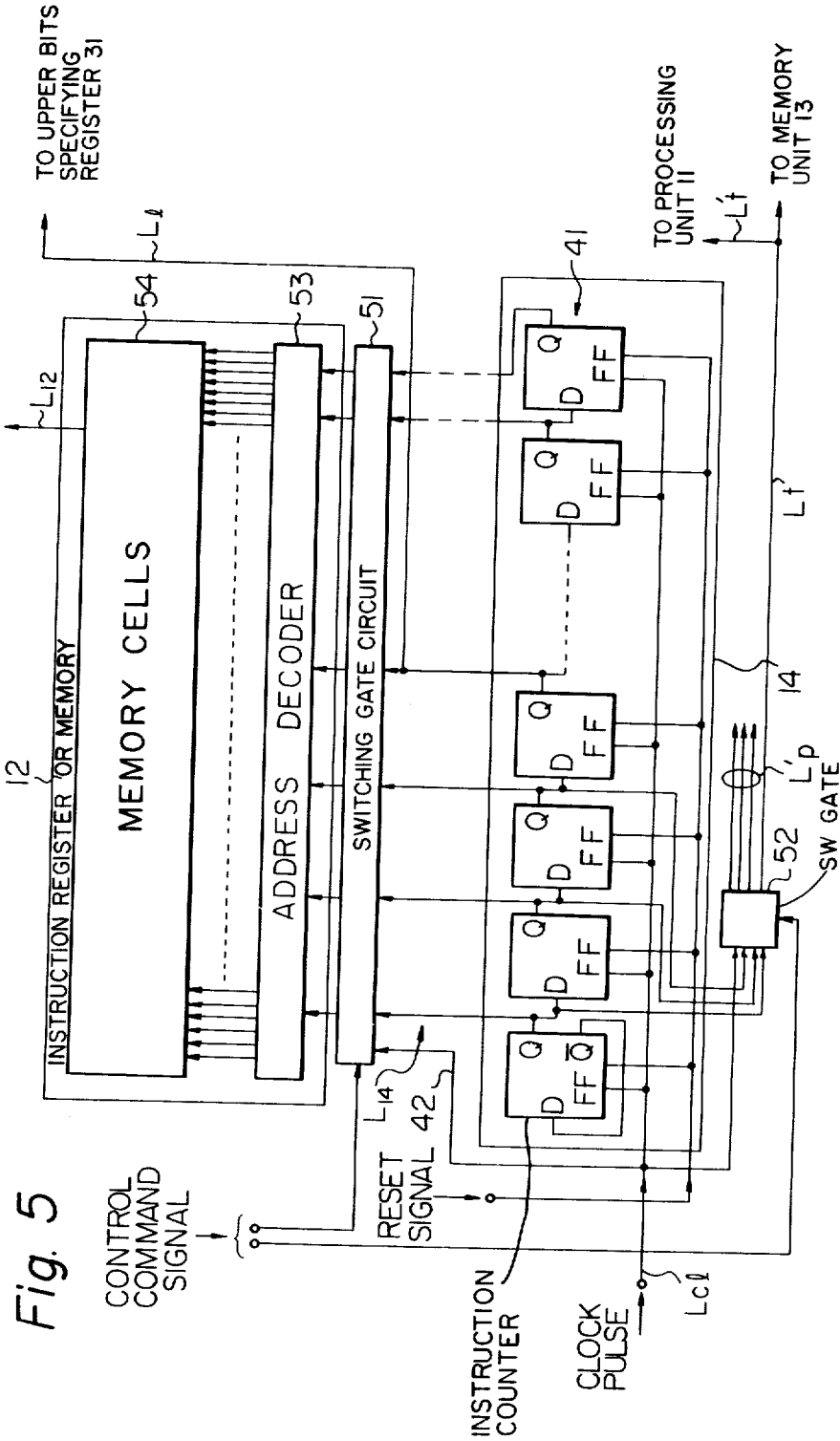

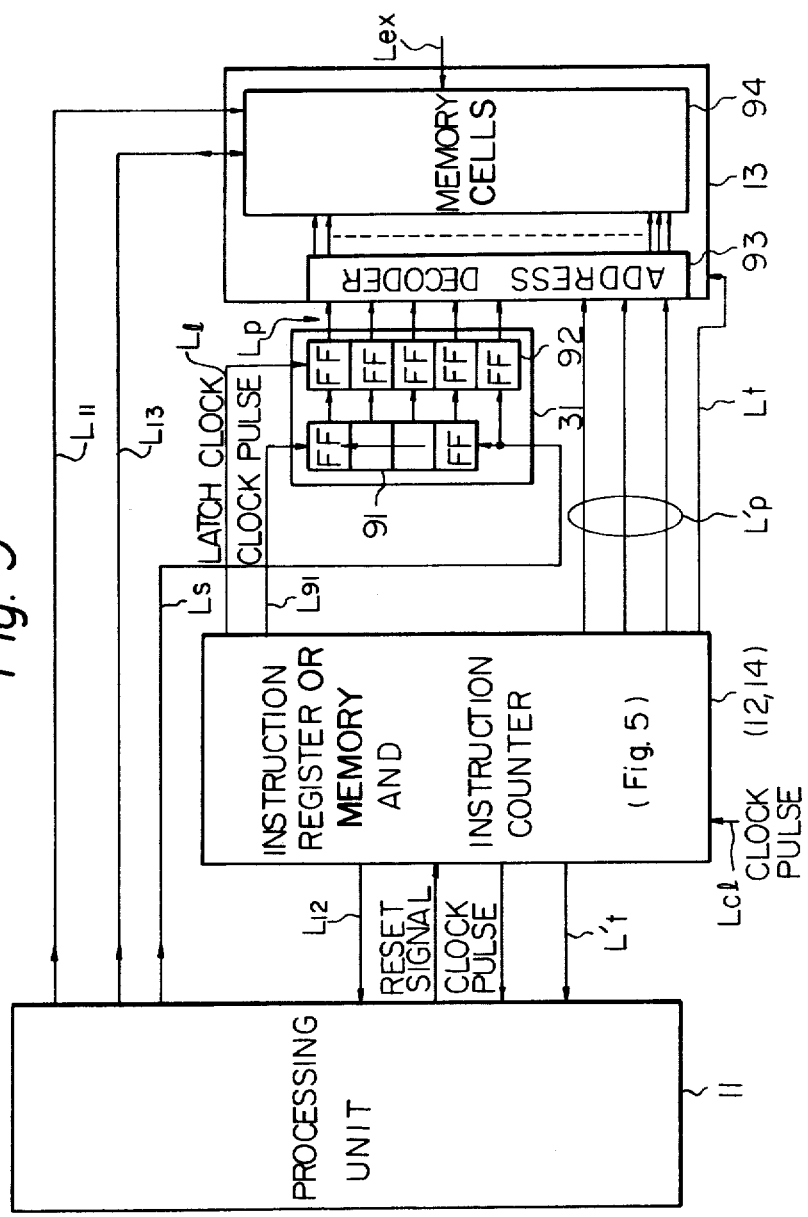

DATA PROCESSING SYSTEM HAVING PORTIONS OF DATA ADDRESSING AND INSTRUCTION ADDRESSING INFORMATION PROVIDED BY A COMMON SOURCE

FIELD OF THE INVENTION

The present invention relates to a data processing system, and more particularly relates to a means for reading or writing data in such a system.

The means for reading or writing data according to the present invention can be applied to various kinds of data processing systems. However, the present invention will be mentioned hereinafter by referring only to a particular data processing system, that is, a microprocessor unit. The microprocessor unit which is used in electronic communication systems functions, for example, as a digital filter or as an automatic equalizer. Either the digital filter or automatic equalizer requires the so-called real-time processing.

DESCRIPTION OF PRIOR ART

In recent years, a so-called pipe line processing operation has been proposed in order to achieve real-time processing in the microprocessor unit. In the pipe line processing operation, much data is successively read by the microprocessor unit. After a small delay, the output data is successively provided therefrom. When the above-mentioned operation is being conducted, it is more preferable to serially transfer the bits of data bit by bit from a processing unit of the microprocessor unit to a data memory unit thereof, or vice versa, than it is to transfer bits of data in parallel from the processing unit to the data memory unit, or vice versa.

In a conventional microprocessor unit, the transmission of the data between the processing unit and the data memory unit is conducted in parallel, and the processing unit and the data memory unit are connected by means of, for example, eight data bus lines or sixteen data bus lines. The conventional parallel transmission of data is useful for high speed data transmission between the processing unit and the data memory unit.

However, in the above-mentioned pipe line operation, the data transmission speed is limited by the speed at which the processing unit processes the input data. Accordingly, the data transmission speed should be less than the speed at which the processing unit processes the input data. Consequently, serial data transmission is suitable for achieving the pipe line operation in the microprocessor unit. This is due to the fact that the speed at which the data is transmitted in the serial data transmission mode is not higher than the speed at which the processing unit processes the input data. Further, serial data transmission is more suitable for achieving pipe line operation than is parallel data transmission. This is due to the fact that when the parallel data transmission mode is being introduced into the microprocessor unit, the microprocessor unit must further contain many additional input/output interfaces, data bus lines and parallel/serial converters. This causes the conventional microprocessor unit to have a complicated construction with high construction costs. However, it should be noted that no microprocessor unit has been heretofore proposed, in which unit a serial data transmission mode is introduced into the data transmission between the processing unit and the data memory unit.

SUMMARY OF THE INVENTION

The inventor of the present invention has already constructed a microprocessor unit in which the serial data transmission mode is utilized. In this prior microprocessor unit, as will be mentioned hereinafter, since an addressing unit for addressing the data memory unit is required, the construction becomes very complicated and also the cost becomes very high.

The addressing unit for addressing the data memory unit is comprised of an addressing circuit for producing the address both for reading the desired data transmitted from the data memory unit and for writing the desired data transmitted to the data memory unit, and is comprised of a timing control circuit for determining both the timing at which the desired data is read during transmission from the data memory unit and the timing at which the desired data is written during transmission to the data memory unit.

Therefore, it is an object of the present invention to provide a microprocessor unit which is simpler in construction and lower in cost than the above-mentioned prior microprocessor unit. More specifically, the microprocessor unit of the present invention requires no addressing unit for addressing the data memory unit, which addressing unit is employed in the prior microprocessor unit.

BRIEF DESCRIPTION OF DRAWINGS

The present invention will be more apparent from the following description with reference to the accompanying drawings wherein:

FIG. 1 is a block diagram showing the prior art data processing system, and more specifically the microprocessor unit which has already been proposed by the inventor of the present invention;

FIGS. 2A, 2B and 2C, respectively depict the bit pattern of the addressing information for specifying the data, and the corresponding wave-form of a timing signal, and also depict the bit pattern of the addressing information for specifying the instruction, and the corresponding wave-form of a timing signal, according to the present invention;

FIG. 5 is a detailed block diagram of both the instruction counter 14 and an instruction register 12 shown in FIG. 3;

FIG. 9 shows a detailed block diagram of an upper bits specifying register 31, a data memory unit 13 shown in FIG. 3, and also the members which cooperate therewith.

DETAILED DESCRIPTION

Figure 2A:
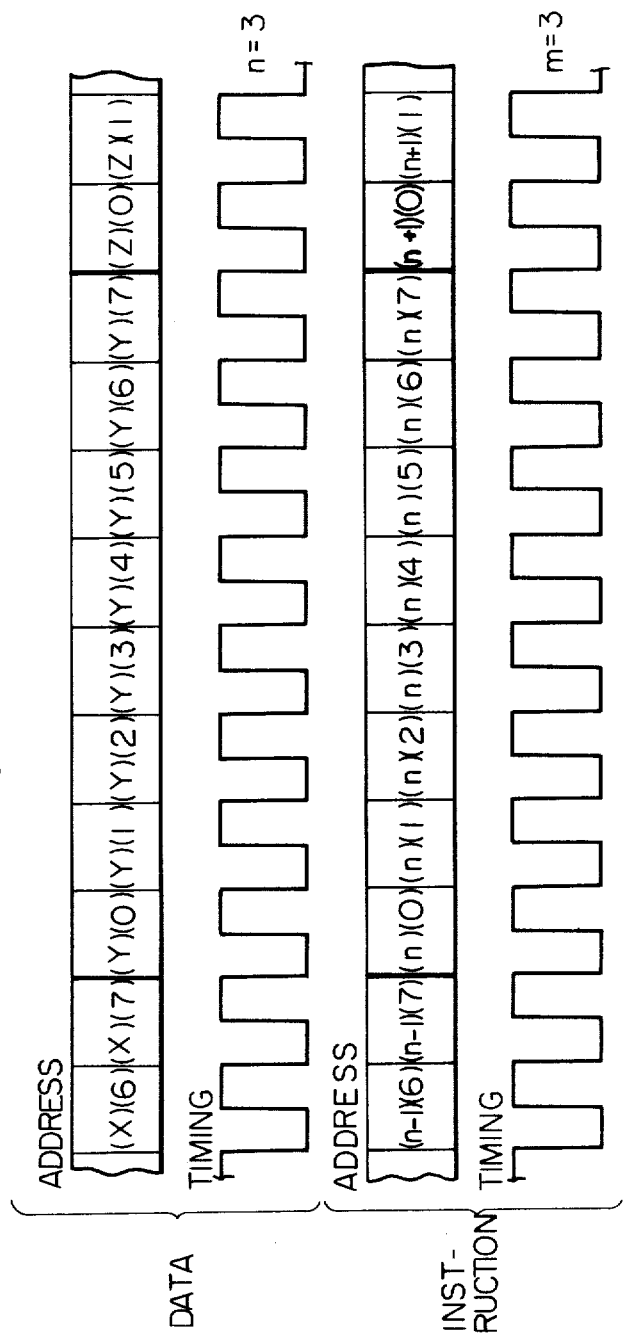

FIG. 1 is a block diagram showing the prior data processing system, and more specifically a microprocessor unit which has already been proposed by the inventor of the present invention. In FIG. 1, a processing unit 11 receives each instruction word provided successively from an instruction register or memory 12 through a line $L_{12}$. At the same time, the processing unit 11 receives the desired data word provided successively from a data memory unit 13 through a line $L_{13}$, whereby the processing unit 11 conducts an arithmetic operation by using both the instruction information and the corresponding data. The data memory unit 13 stores a plurality of instructions to be carried out in the processing unit 11. This plurality of instructions is stored in the instruction register or memory 12 in the order of the sequential arithmetic operation to be conducted in the processing unit 11. An instruction counter 14 provides a digital signal to the instruction register or memory 12 by way of lines $L_{14}$ in order to produce the instructions in the aforesaid order. Thus, each instruction is successively read by the processing unit 11.

On the other hand, the data memory unit 13 stores each result provided from the processing unit 11, each result being serially transferred thereto bit by bit through the line $L_{13}$. The data memory unit 13 also stores data which is newly supplied from an electronic device (not shown) through a line $L_{ex}$. The reference numeral 15 indicates an addressing unit for producing, via line $L_{15}$, the address for reading the desired data transmitted from the data memory unit 13 or for writing the desired data transmitted to the memory unit 13, and also for determining the timing during which the desired data is read or written during such transmissions. The addressing unit 15 is controlled by control information provided from the processing unit 11 through a line $L_{11}$. The addressing unit 15 is also controlled by a digital signal supplied from the instruction counter 14 through a line $L'_{14}$. The instruction counter 14 comprises a binary counter which counts up in accordance with clock pulses supplied from an oscillator (not shown) through a line $L_{cl}$. The clock pulses are utilized for defining the timing for transferring the desired data by way of the line $L_{13}$. The clock pulses are further utilized for timing the transfer of instructions through line $L_{13}$. The digital signal formed by the clock pulses exhibits a frequency which is higher than any of the frequencies of the other various kinds of digital signals occurring in the system.

The above-mentioned prior microprocessor unit requires the use of the addressing unit 15. Since the addressing unit 15 must comprise both an addressing circuit (not shown) which produces the address for reading the desired data transmitted from the data memory unit 13 or for writing the desired data transmitted to the data memory unit 13, and a timing control circuit (not shown), and further, since the number of bits composing the data transmitted over the line $L_{15}$ is extremely large, the construction of the addressing unit 15 becomes very complicated and its cost also becomes very high. Accordingly, the defects of the prior microprocessor unit shown in FIG. 1 reside in its complicated construction and also in its high construction costs.

In order to overcome the above-mentioned defects of the prior microprocessor unit, the microprocessor unit of the present invention does not include any addressing unit 15. However, the function of the omitted addressing unit is still maintained by carrying out a unique method, according to the present invention, for reading or writing the desired data. This unique method for conducting the read-write operation will become clearer from an examination of the following description.

The principle of the above-mentioned unique method for conducting the read-write operation according to the present invention is as follows. The address of the data transmitted over the line $L_{13}$ can be partially represented by a number of bit signals which are produced by the instruction counter 14 and provided through some of the lines $L_{14}$. On the other hand, the address of the instruction is represented by all of the bit signals which are provided through all of the lines $L_{14}$. However, it should be noted that, in order to achieve synchronization between the addressing operation for the instruction and the addressing operation for the data, the length M of the instruction word should be equal to the length N of the data word or the length M of the instruction word should be a multiple of the length N of the data word, or vice versa. In other words, the length M should be expressed by $2^m$, and the length N should be expressed by $2^n$. The value $2^m$ indicates the number of bits which compose the instruction word, while the value $2^n$ indicates the number of bits which compose the data word, where for example, n is 2 or 3 and m is 2 or 3.

Figure 2C:
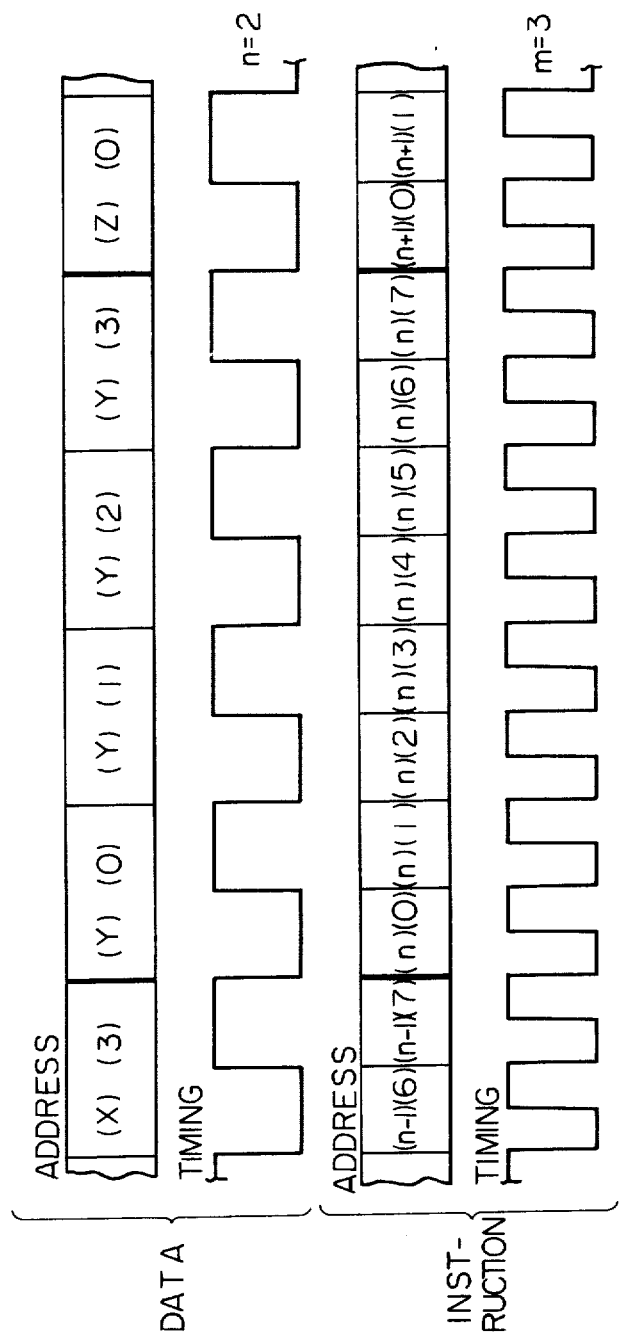

FIGS. 2A, 2B and 2C respectively depict the bit pattern of the addressing information for specifying the data, and also depict the corresponding wave-form of a timing signal. The figures also depict the bit pattern of the addressing information for specifying the instruction, and the corresponding wave-form of a timing signal, according to the present invention. In FIG. 2A, the data word has a length of N bits which is equal to 8 ($=2^n$, where n$=$3) bits for example, each bit of the word being addressed by $|(Y)(0)|$, $|(Y)(1)|$ ... $|(Y)(7)|$. Furthermore, the instruction word has a length of bits which is equal to 8 ($=2^m$, where m$=$3) bits, for example, each bit of the word being addressed by $|(n)(0)|$, $|(n)(1)|$ ... $|(n)(7)|$. In FIG. 2B, the data word has a length of N bits which is equal to 8 ($=2^n$, where n$=$3) bits, for example, each bit of the word being addressed by $|(Y)(0)|$, $|(Y)(1)|$ ... $|(Y)(7)|$. The instruction word has a length of M bits which is equal to 4 ($=2^m$ where m$=$2) bits, for example, each bit of the word being addressed by $|(n)(0)|$, $|(n)(1)|$ ... $|(n)(3)|$. As seen in FIG. 2B, the number of bits N is a multiple of the number of bits M. However, in order to achieve the above-mentioned synchronization between the data addressing operation and the instruction addressing operation, each bit length of the instruction addressing information is expanded to twice the bit length of the data addressing information. Accordingly, the ending time of the instruction addressing coincides with the ending time of the data addressing. In FIG. 2C, the data word has a number of bits N which is equal to 4 ($=2^n$, where n$=$2) bits, for example each bit of the word being addressed by, $|(Y)(0)|$, $|(Y)(1)|$ ... $|(Y)(3)|$. The instruction word has a number of bits M which is equal to 8 ($=2^m$, where m$=$3) bits, for example, each bit of the word being addressed by $|(n)(0)|$, $|(n)(1)|$ ... $|(n)(7)|$. As seen in FIG. 2C, the number of bits M is a multiple of the number of bits N. However, in order to achieve the above-mentioned synchronization between the data addressing operation and the instruction addressing operation, each length of the data addressing information is expanded to twice the bit length of the instruction addressing information. The microprocessor unit according to the present invention should be operated on the basis of the bit synchronization depicted in either FIG. 2A, 2B or 2C.

In FIG. 2A, the symbol (Y) (and also symbols (X) and (Z)) schematically represents the upper bits of the data addressing information. The increment numerals (0), (1) ... which are respectively paired to each symbol (Y) schematically represent the lower bits of the data addressing information. In the addressing information of a desired data (y) represented by the bit patterns, for example,

|10110 : 000|,
|10110 : 001|,
|10110 : 010|,
|10110 : 011|,
|10110 : 100|,
|10110 : 101|,
|10110 : 110|,
|10110 : 111|, the respective symbol (Y) indicates the five bits comprising the most significant bit (MSB) and the four nearest adjacent bits that is (10110); and the numerals (0), (1), (2) ... (7) respectively indicate the three bits comprising the least significant bit (LSB) and the two nearest adjacent bits that is (000), (001), (010) ... (111). Since the data is randomly accessed in this system, the symbols (X) and (Z) will be represented by random bit patterns, for example, (11101) and (00001), respectively. Similarly, the respective symbol (n) may be represented by a bit pattern, for example (10101). In addition, the increment numerals (0), (1), (2) ... (7) which are paired to each symbol (n) indicate (000), (001), (010) ... (111), respectively. Since the instruction addressing information is successively produced by the instruction counter 14 (FIG. 1), when the respective symbol (n) indicates (11101) as previously mentioned, the respective symbol (n−1) will indicate (11100) and the respective symbol (n+1) will indicate (11110). On the other hand, in FIG. 2B, the increment numerals (0), (1), (2) and (3) which are individually paired to each symbol (n) represent bit patterns (00), (01), (10) and (11), respectively. Similarly, in FIG. 2C, the increment numerals (0), (1), (2) and (3) which are individually paired to each symbol (Y) represent bit patterns (00), (01), (10) and (11), respectively.

As mentioned above, with regard to the instruction addressing information, both the upper bits of the instruction address, that is (n−1), (n), (n+1) ..., and the lower bits of the corresponding address, that is (0), (1) ... (3) or (0), (1) ... (7) are successively increased. Accordingly, the instruction addressing information can be easily produced by a binary counter which corresponds to the instruction counter 14 in FIG. 1, while with regard to the data addressing informaton, the upper bits of the data address, (that is, (X), (Y), (Z) ...) are randomly determined by the processing unit 11 in FIG. 1. However, the lower bits of the address with regard to the data (that is, (0), (1) ... (3) or (0), (1) ... (7)) are increased successively, for example, (00), (01), (10) and (11) or, for example, (000), (001), (010), (011), (100), (101), (110) and (111). The reason for the successive increase of the lower bits of the address with regard to the successive data increase is that, in the present invention, the desired data word transmitted over the line $L_{13}$ is serially provided bit by bit. Thus, although the upper bits of the address for addressing the data are randomly determined by the processing unit 11 (shown in FIG. 1), the lower bits of the address for addressing the data are always successively determined. Thereby, the lower bits for addressing the data may easily be produced by a binary counter. Accordingly, it is desirable to achieve this function of the binary counter by utilizing the instruction counter 14 shown in FIG. 1.

Consequently, in the present invention, the instruction counter 14 provides not only the instruction addressing information but also the lower bits of the data addressing information. In this case, the starting time for producing the instruction addressing information should coincide with the starting time for producing the data addressing information. Likewise, the ending time for producing the instruction addressing information should coincide with the ending time for producing the data addressing information. Therefore, as mentioned previously, the number of bits (N) in the data word should be equal to the number of bits (M) in the instruction word, that is N:M=8:8; or a number of bits (N) should be a multiple of the number of bits (M), that is N:M=8:4; or the number of bits (M) should be a multiple of the number of bits (N), that is N:M=4:8.

Figure 3:
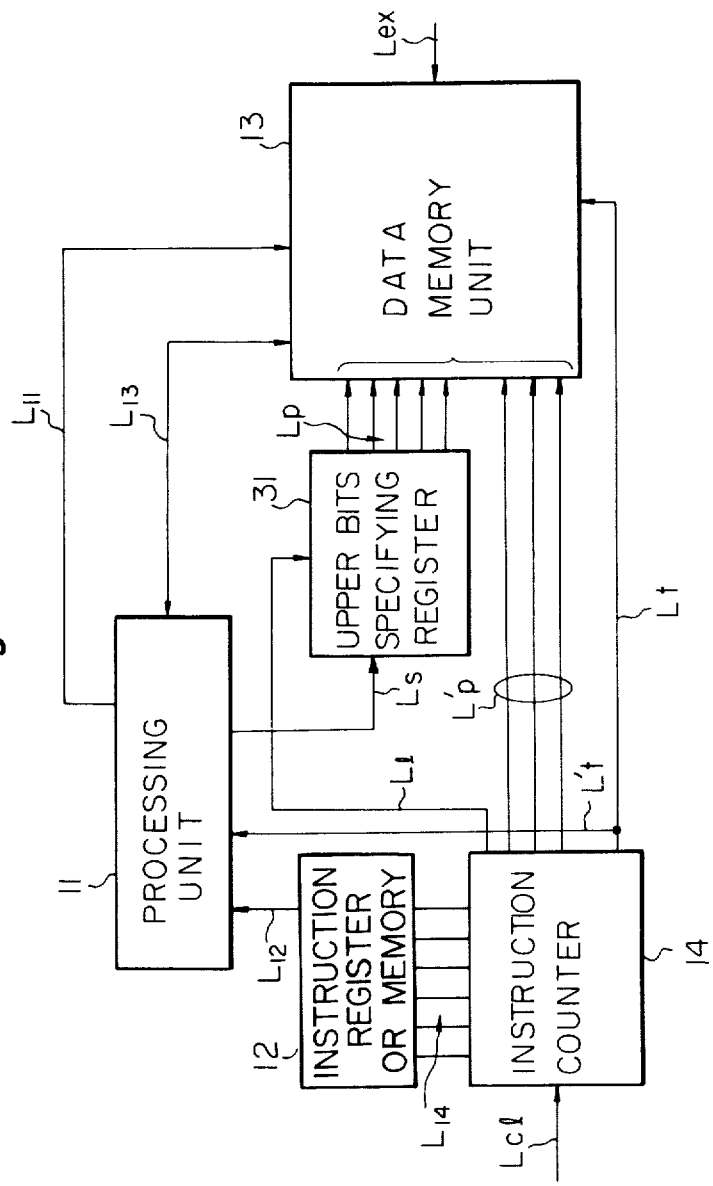
FIG. 3 is a block diagram showing a microprocessor unit according to the present invention.

FIG. 3 is a block diagram showing a microprocessor unit according to the present invention. In FIG. 3, the elements indicated by reference numerals 11, 12, 13, 14 and the data lines indicated by reference symbols $L_{12}$, $L_{13}$, $L_{14}$, $L_{cl}$, $L_{ex}$ are substantially the same as those corresponding elements and data lines shown in FIG. 1. As seen in FIG. 3, however, the addressing unit 15 in FIG. 1 has been omitted, while the data memory unit 13 is directly connected to the instruction counter 14 through the lines $L_p'$. As mentioned previously by referring to FIGS. 2A, 2B and 2C, since the data addressing operation is conducted synchronously with the operation of instruction addressing, the lower bits being transferred over lines $L_p'$ can be directly supplied by the instruction counter 14. Further, the data memory unit 13 is connected to the processing unit 11 through a line $L_s$, an upper bits specifying register 31 and lines $L_p$. The upper bits specifying register 31 is also connected to the instruction counter 14 by a line $L_l$, which line also transmits a latch clock (explained hereinafter) to the register 31.

The upper bits specifying register 31 receives the upper bits of the address for addressing the desired data word from processing unit 11 over line $L_s$; the data word is then transmitted over the line $L_{13}$ to processing unit 11. The upper bits of the address for the data are serially transferred, bit by bit, from the processing unit 11 to the upper bits specifying register 31 through line $L_s$ and stored momentarily therein until the transmission of the desired data word through the line $L_{13}$ is completed. The upper bits of the data stored in the register 31 equal the same predetermined number of bits previously defined as comprising the MSB, and nearest adjacent bits of the data addressing information (that is, the bits represented schematically by the symbol (X), (Y) or (Z)) as shown in FIGS. 2A, 2B and 2C. The above-mentioned latch clock, which is provided from the counter 14 to the register 31 through the line $L_l$, determines the time when the register 31 should sample the upper bits of the address transmitted over the line $L_s$. The latch clock is sequentially produced by the instruction counter 14 and is then transferred to the upper bits specifying register 31 by line $L_l$.

The lower bits of the address transmitted over the lines $L_p'$ are equal to the predetermined bits previously defined as comprising the LSB and nearest adjacent bits of the data addressing information (that is, the bits indicated schematically by the numerals (0), (1) ... (3) or (0), (1) ... (7), which numerals correspond to the symbol (X), (Y) or (Z) ) as shown in FIGS. 2A, 2B and 2C. The lower bits are provided from the instruction counter 14, and, accordingly, both the lower bits of the data addressing information and the lower bits of the instruction addressing information commonly occupy the lower bits of the instruction counter 14. The instruction counter 14 also transmits a read-write synchronizing control signal to the data memory unit 13 over a line $L_t$. The read-write synchronizing control signal determines the timing for reading or writing the data in the data memory unit 13 and maintains a normal synchronization between the data addressing operation and the instruction operation. The read-write synchronizing control signal should be provided in accordance with the relationships which exist between the number of bits (N) of the data word and the number of bits (M) of the instruction word, i.e. (8:8), (8:4) or (4:8).

Figure 4A:
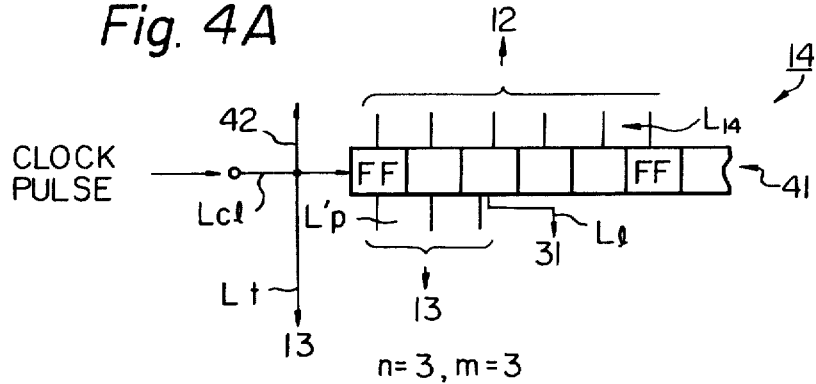
FIGS. 4A, 4B and 4C respectively show schematic drawings of partial wirings of an instruction counter 14 shown in FIG. 3.
Figure 4B:
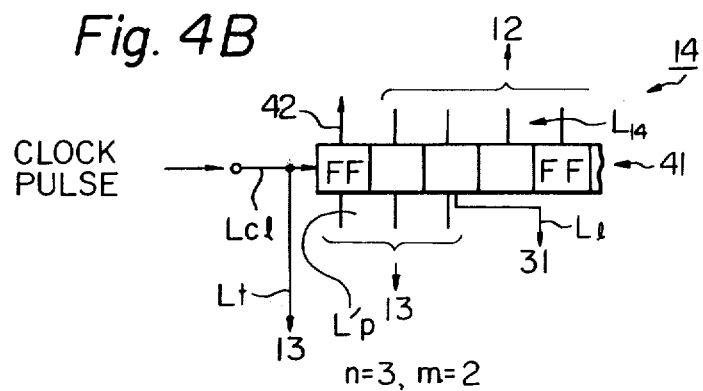
Figure 4C:
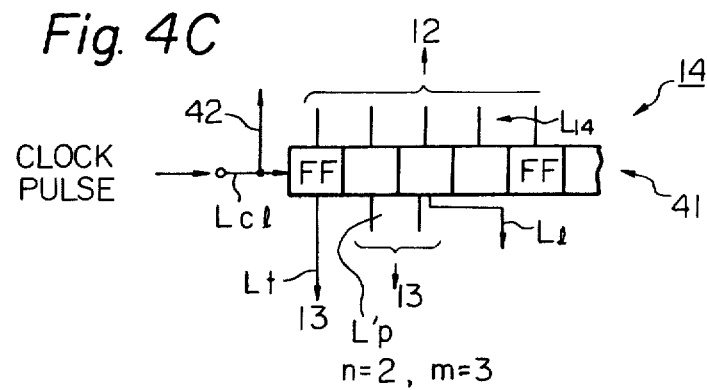

FIGS. 4A, 4B and 4C, respectively and schematically show the partial wirings of the instruction counter 14 shown in FIG. 3. In FIGS. 4A, 4B and 4C, the symbols FF indicate flip-flops. Accordingly, a series of flip-flops FF forms a binary counter 41. Further, the symbols $L_{14}$, $L_l$, $L_p'$, $L_t$ and $L_{cl}$ indicate the same corresponding line or lines as those shown by the same symbols in FIG. 3. The timing control signal is transferred over line 42 to the instruction register or memory 12 shown in FIG. 3. It should be noted that the partial wirings shown in FIGS. 4A, 4B and 4C are formed in the instruction counter 14 when the microprocessor unit 11 is operating under conditions wherein the relationships between the timing pattern of the data and the timing pattern of the instruction are established as shown in FIGS. 2A, 2B and 2C, respectively.

As seen in FIGS. 4A, 4B and 4C, both the lower bits of the data addressing information applied to the data memory unit 13 and the lower bits of the instruction addressing information applied to the instruction register or memory 12 commonly occupy the lower bits of the binary counter 41 of the instruction counter 14. In FIGS. 4A, 4B and 4C, the flip-flop of the counter 41 which is located at the left end of the counter 41 corresponds to the LSB.

In FIG. 4A, the lower bits of the instruction addressing information are connected to the respective three bits comprising the LSB and the next two adjacent bits. In the same Figure, the lower bits of the data addressing information are also connected to the respective three bits comprising the LSB and the next two. Thus, the lower bits of the data addressing information and also the lower bits of the instruction addressing information are composed of 3 bits as shown in FIG. 2A. The wave-form of the timing control signal, which is transferred by line 42, is shown in the row designated "TIMING" of the section entitled "INSTRUCTION" in FIG. 2A. The line $L_t$ transfers a read-write timing control signal. In FIG. 2A, the wave-form of the read-write timing control signal is shown in the row designated "TIMING" of the section entitled "DATA". In this case, the line $L_l$ which transfers the latch clock is connected to the third bit (second bit from the LSB).

In FIG. 4B, the lower bits of the instruction addressing information are connected to the second and third bits after the LSB. The LSB is connected to the line 42. The lower bits of the data addressing information are connected to the LSB and the next two bits after the LSB. Thus, the data addressing information is composed of 3 bits, while the instruction addressing information is composed of 2 bits as shown in FIG. 2B. The line 42 transfers the timing control signal exhibiting the wave-form shown in the row "TIMING" of the section entitled "INSTRUCTION" in FIG. 2B. The line $L_t$ transfers the read-write timing control signal exhibiting the wave-form shown in the row "TIMING" of the section entitled "DATA" in FIG. 2B. In this case, the line $L_l$ which transfers the latch clock is connected to the third bit located from the LSB.

In FIG. 4C, the lower bits of the instruction addressing information are connected to the LSB and the next two after the LSB. Further, the lower bits of the data addressing information are connected to the respective second and third bits after the LSB. Thus, the data addressing information is composed of 2 bits, while the instruction addressing information is composed of 3 bits as shown in FIG. 2C. The line 42 provides the timing control signal having the wave-form shown in the row designated "TIMING" of in the section entitled "INSTRUCTION" in FIG. 2C. The line $L_t$ provides the read-write timing control signal exhibiting the wave-form which is shown in the row designated "TIMING" of the section entitled "DATA" in FIG. 2C. In this case, the line $L_l$ which transfers the latch clock is connected to the third bit (second bit after the LSB).

As explained above with reference to FIG. 3 and FIGS. 4A, 4B and 4C, the lower bits of the instruction counter 14 are commonly used for providing both the lower bits of the instruction addressing information applied to the instruction register or memory 12 and the lower bits of the data addressing information applied to the data memory unit 13. In this case, when the number of bits of the data addressing information is 3 and the number of bits of the instruction addressing information is 2 (corresponding to FIG. 2B), synchronization between the data addressing operation and the instruction addressing operation can be easily achieved by shifting the least significant bit of the instruction addressing information upwardly by one bit with respect to the least significant bit of the data addressing information (see FIG. 4B). When the number of bits of the data addressing information is 2 and the number of bits of the instruction information is 3 (corresponding to FIG. 2C), synchronization between the data addressing operation and the instruction addressing operation also can be easily achieved by shifting the least significant bit of the data addressing information upwardly by one bit with respect to the least significant bit of the instruction addressing information (see FIG. 4C).

FIG. 5 is a detailed block diagram of both the instruction counter 15 and the instruction register 12 shown in FIG. 3. In FIG. 5, the reference symbols $L_{14}$, $L_t$, $L_p'$, $L_l$, $L_{cl}$ indicate correspnding lines which are also shown by the same symbols in FIGS. 3, 4A, 4B and 4C. Reference numerals 41 and 42 indicate a corresponding element and line which are also designated by the same numbers in FIGS. 4A, 4B and 4C. In FIG. 5, the reference numerals 51 and 52 indicate a first switching gate circuit and a second switching gate circuit (SW GATE), respectively. A control command signal (shown as CONTROL COMMAND SIGNAL) is supplied from the processing unit 11 (shown in FIG. 3) to both the first and the second switching gate circuits 51, 52. A reset signal (shown as RESET SIGNAL) is supplied from the processing unit 11 (in FIG. 3) to the binary counter 41 in the instruction counter 14. The binary counter 41 counts the clock pulses supplied by the line $L_{cl}$ after the binary counter 41 has been reset by the reset signal. The output from the Q terminal of each of the flip-flops FF is applied to the address decoder 53 in the instruction register 12 by means of the first switching gate circuit 51. When the address decoder 53 successively specifies a desired instruction information from among many instruction informations stored in the memory cells 54, the specified instruction information is supplied to the processing unit 11 through line $L_{12}$. The address decoder 53 and memory cells 54 may be implemented by conventional means; for example, a read-only memory (ROM) could be used.

Figure 6:
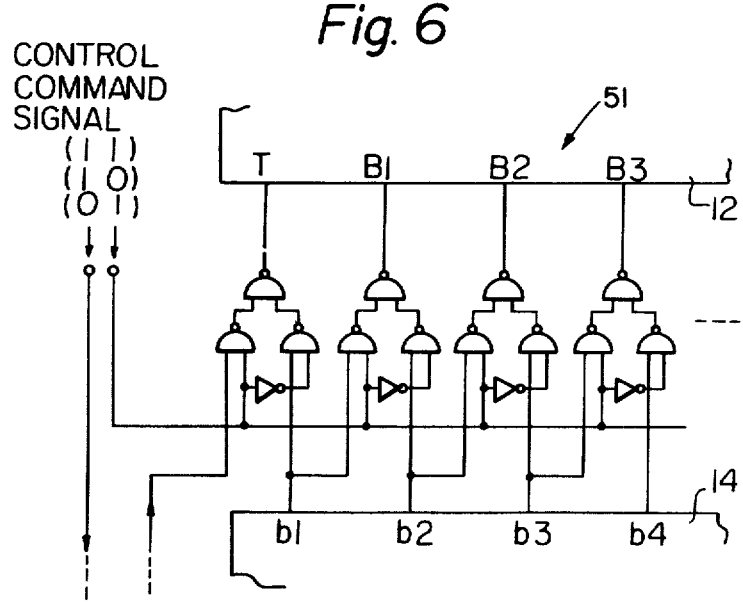
FIG. 6 is a detailed block diagram of a first switching gate circuit 51 shown in FIG. 5.
Figure 7:
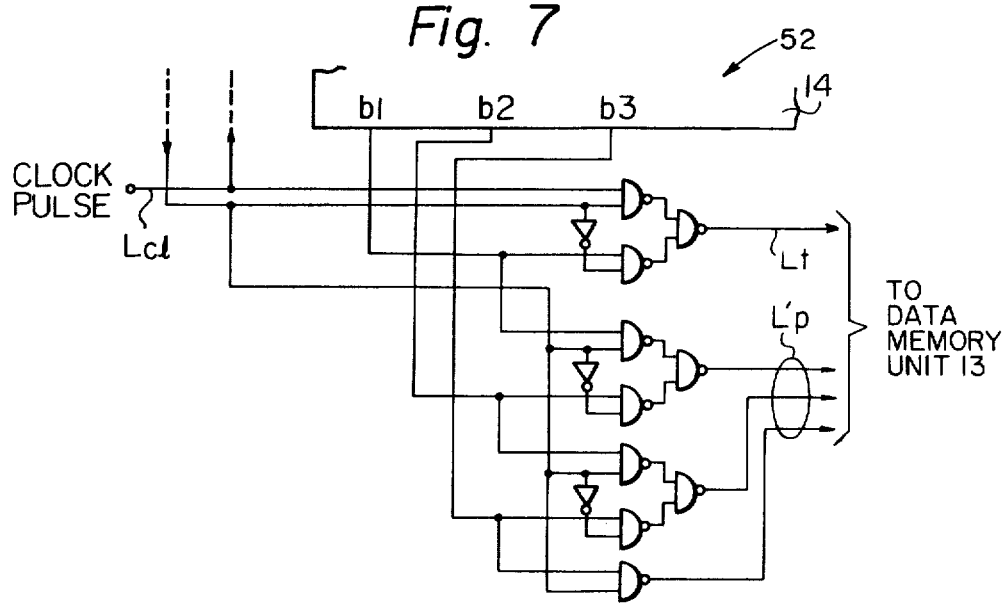
FIG. 7 is a detailed block diagram of a second switching gate circuit 52 shown in FIG. 5.

The microprocessor unit operates by using both the data addressing information and the instruction addressing information having the same bit patterns as those shown in FIGS. 2A, 2B or 2C. The first and second switching gate circuits 51, 52 change the flow paths of the signals in accordance with a control command signal which originates from the processing unit 11, or in accodance with a signal which is supplied manually by an external control unit (not shown). The logic state of the control command signal varies in accordance with the operating mode shown in FIGS. 2A, 2B and 2C. The first switching gate circuit 51 is shown in FIG. 6, and the second switching gate circuit 52 is shown in FIG. 7. As previously explained by referring to FIGS. 4A, 4B and 4C, the least significant bit of the instruction addressing information and the least significant bit of the data addressing information are relatively shifted by one bit. The shifting operation of either one of the least significant bits is performed by using the first and second switching gate circuits 51 and 52 are shown in FIGS. 6 and 7. When the microprocessor unit is operated by using the pair of data addressing information and instruction addressing information having bit patterns as those shown in FIG. 2A, the control command signal then attains the logic status (1 1). Thereby, in FIG. 6 the clock pulses are applied to the instruction register 12 at the timing control terminal T thereof. Accordingly, the output from the first bit terminal b1 of the instruction counter 14 is applied to the first bit terminal B1 of the instruction register or memory 12. Similarly, the outputs from the bit terminals b2, b3 ... are respectively applied to the bit terminals B2, B3 .... At the same time, the above-mentioned clock pulses are provided to the line $L_t$, as shown in FIG. 7. Accordingly, when the control command signal has a logic status of (11), the wiring of the instruction counter 14 as shown in FIGS. 4A is formed. When the microprocessor unit operates by using the pair of data addressing information and instruction addressing information having the bit patterns as shown in FIG. 2B, the control command signal then attains a logic status (1 0). Thereby, the clock pulses are not applied to the instruction register or memory 12. However, the outputs from the bit terminals b1, b2, b3 ... are respectively applied to the timing control terminal T and to the bit terminals B1, B2, B3 .... The above-mentioned clock pulses are provided at the same time to the line $L_t$ as shown in FIG. 7. Accordingly, when the control command signal has a logic status of (1 0), the wiring of the instruction counter 14, as shown in FIG. 4B, is formed. When the microprocessor unit operates by using the pair of data addressing information and instruction addressing information having the bit patterns as shown in FIG. 2C, the control command signal then attains a logic status (0 1). Thereby, in FIG. 6, the clock pulses are applied to the instruction register 12 at the timing control terminal T thereof. Accordingly, the output from the first bit terminal b1 of the instruction counter 14 is applied to the first bit terminal B1 of the instruction register or memory 12. In a similar way, the outputs from bit terminal b2, b3 ... are respectively applied to the bit terminals B2, B3 .... At the same time, as shown in FIG. 7, the output from the bit terminal b1 is provided to the line $L_t$. Accordingly, the logic status (0 1) of the control command signal causes the wiring of the instruction counter 14 to be formed as shown in FIG. 4C.

In FIG. 7, when the microprocessor unit is operated by using the pair of data addressing information and instruction addressing information having bit patterns as those shown in FIG. 2A, the control command signal then attains the logic status (1 1). Thereby, the clock pulses are applied to the line $L_t$. Similarly, the outputs from the bit terminals b1, b2 and be are respectively applied to the line Lp'. Accordingly, when the control command signal has a logic status of (11), the wiring of the instructor counter 14 as shown in FIG. 4A is formed. When the microprocessor unit operates by using the pair of data addressing information and instruction addressing information having the bit patterns as shown in FIG. 2B, the control command signal then attains a logic status (1 0). Thereby, the clock pulses are applied to the line $L_t$. The outputs from the bit terminals b1, b2 and b3 are applied to the line $L_p'$. Accordingly, when the control command signal has a logic status of (1 0), the wiring of the instruction counter 14, as shown in FIG. 4B, is formed. When the microprocessor unit operates by using the pair of data addressing information and instruction addressing information having the bit patterns as shown in FIG. 2C, the control command signal then attains a logic status (0 1). Thereby, the clock pulses are not applied to the line $L_t$, while the output from the first bit terminal b1 of the instruction counter 14 is applied to the line $L_5$. In a similar way, the outputs from bit terminals b2 and b3 are applied to the line $L_p'$. Accordingly, the logic status (0 1) of the control command signal causes the wiring of the instruction counter 14 to be formed as shown in FIG. 4C.

Figure 8:
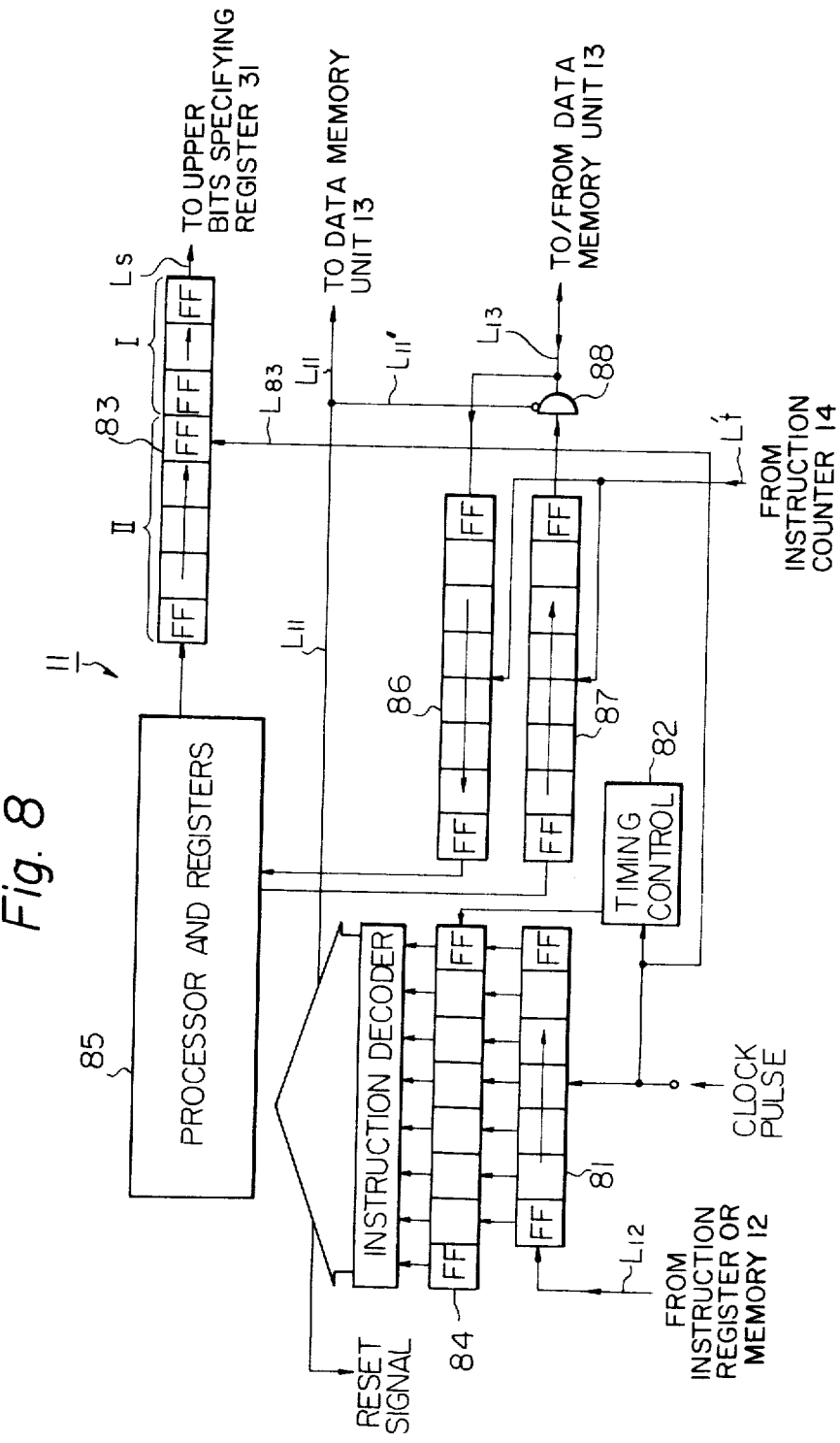
FIG. 8 is a detailed block diagram of a processing unit 11 shown in FIG. 3.

FIG. 8 is a detailed block diagram of the processing unit 11 shown in FIG. 3. In FIG. 8, the reference symbols $L_{11}$, $L_{12}$, $L_{13}$, $L_s$ and $L_t'$ indicate the same corresponding lines as those shown in FIG. 3. The "RESET SIGNAL" shown in FIG. 8 corresponds to the same RESET SIGNAL shown in FIG. 5. The reference numeral 81 indicates a shift register which receives the instruction information supplied from the instruction register or memory 12 (FIGS. 3 and 5) by way of the line $L_{12}$. The shift pulses of the shift register 81 are formed by the clock pulses (shown as CLOCK PULSE in FIG. 8. The clock pulses are also applied to a timing control circuit 82 and a register 83. When the timing control circuit 82 (which may be implemented by conventional counting means—for example, a 3-bit binary counter) has finished counting a predetermined number of clock pulses, the instruction information stored in the shift register 81 is transferred to a buffer register 84. The instruction information now stored in the buffer register 84 is next applied to a unit 85 which is comprised of an arithmetic processor and a plurality of registers. The unit 85 produces the aforementioned upper bits of the address for addressing the data to be read from or the data to be written to the data memory unit 13. These upper bits are provided to the upper bits specifying register 31 by means of the shift register 83 and the line $L_s$. The shift register 83 is divided into two sections, I and II, and is driven by the shift pulses applied through the line $L_{83}$. The division of the shift register into two sections I and II is necessary in order to simplify the clock pulse control system in the microprocessor unit. Section I of the shift register 83 stores inoperative upper bits of the data addressing information, while section II of the shift register 83 stores the operative upper bits of the data addressing information. The inoperative upper bits can be necessarily omitted by a shift register located in the upper bits specifying register 31 (shown in FIG. 9), because the shift register of the upper bits specifying register 31 is composed of four bits. The data to be read from the data memory unit 13 (FIG. 3) is supplied therefrom and transferred to the unit 85 by means of the line $L_{13}$ and a shift register 83. On the other hand, the data to be written to the data memory unit 13 (FIG. 3) is provided and transferred to the unit 13 by means of a shift register 87 and the line $L_{13}$. Shift pulses are applied to both the shift registers 86 and 87 by utilizng the line $L_s'$ (which is connected to the line $L_t$) (shown in FIG. 3). The shift registers 86 and 87 are alternately utilized in accordance with a read-write determining signal which is applied to a tri-state buffer 88 via the lines $L_{11}$ and $L_{11}'$. The line $L_{11}$ is also connected to the data memory unit 13 as shown in FIG. 3.

FIG. 9 shows a detailed block diagram of the upper bits specifying register 31, the data memory unit 13 shown in FIG. 3, and also the elements which cooperate therewith. In FIG. 9, the reference symbols $L_{11}$, $L_{12}$, $L_{13}$, $L_s$, $L_t$, $L_p$, $L_p'$, $L_{cl}$, $L_{ex}$, $L_5$ and $L_t'$ indicate the same corresponding lines as those shown by the same reference symbols in FIG. 3 and also in FIGS. 5, 6, 7 and 8. In FIG. 9, the upper bits of the data addressing information are serially stored in the shift register 91 of the upper bits specifying register 31 by way of the line $L_s$. Clock pulses functioning as shaft pulses are provided to the register 91 through the line $L_{91}$.

When the above-mentioned latch clock shown in FIG. 9 is supplied to a buffer register 92 of the upper bits specifying register 31 via the line $L_t$, the data addressing information is transferred thereafter to the buffer register 92. An address decoder 93 in the data memory unit 13 receives the upper bits of the data addressing information by means of the line $L_p$ and the lower bits of the data addressing information by means of the line $L_p'$. The output from the address decoder 93 determines the address of a memory 94 in the data memory unit 13. Address decoder 93 and memory 94 may be implemented by conventional means—for example, a read-only memory (ROM). The upper bits do not change during that time when a write operation or a read operation is being conducted with regard to some particular desired data. However, the lower bits successively change from (000) to (111) in synchronization with the application of the clock pulses during that time when a write operation or a read operation is being conducted with regard to the same desired data.

According to the above-mentioned present invention, since both the lower bits of the instruction addressing information and the lower bits of the data addressing information commonly utilize the lower bits of the instruction counter 14, the construction of the addressing means for addressing the data memory unit 13 is, therefore, more simple than that of the prior art. Furthermore, the prior art addressing unit 15 (FIG. 1) which is comprised of an addressing circuit and a timing control circuit can be omitted from the microprocessor unit by replacing the prior art addressing unit 15 with the simple upper bits specifying register 31 of the present invention. Consequently, the microprocessor unit of the present invention is simple in construction and low in cost.

What is claimed is:

1. In a data processing system for processing data in accordance with read and write operations, comprising:
   a processing unit for processing input data after said read operation in accordance with a plurality of instructions provided thereto and producing output data for said write operation:
   instruction means for supplying said plurality of instructions successively to said processing unit;
   instruction counter means driven by a clock pulse signal for providing instruction addressing information to said instruction means, said instruction means successively producing said plurality of instructions in accordance with said instruction addressing information, said instruction addressing information comprising upper and lower bits; and
   a data memory unit having addressable storage areas for providing said input data to be processed in accordance with data addressing information, and for receiving said output data produced by said processing unit, said data addressing information comprising upper bits and lower bits;
   said data processing system being characterized in that said input data is transmitted serially bit by bit from said data memory unit to said processing unit during the read operation, and said output data is transmitted serially bit by bit from said processing unit to said data memory unit during the write operation;
   the improvement wherein said instruction counter means comprises an upper bits region for holding said upper bits of said instruction addressing information, and a lower bits region for holding said lower bits of both said instruction addressing information and said data addressing information;
   said instruction counter means including means for synchronously providing the contents of said lower bits region of said instruction counter means in synchronization both to said instruction means as said lower bits of said instruction addressing information and to said data memory unit as said lower bits of said data addressing information, whereby said lower bits of said instruction addressing information and said data addressing information, respectively, are provided by a common source;
   said instruction counter means also including first means for providing the contents of said upper bits region of said instruction counter means to said instruction means as said upper bits of said instruction addressing information;
   said system further comprising generating means for continuously generating random bits partially defining successive addressable storage areas in said data memory unit to be addressed, and second means connected to said generating means for providing said random bits to said data memory unit as said upper bits of said data addressing information, whereby said processing unit is instruction-addressed and said data memory unit is data-addressed in synchronization, one with the other, with resultant improved efficiency.

2. In a data processing system as set forth in claim 1, wherein said data memory unit comprises an address decoder and a memory connected thereto, wherein said address decoder is divided into an upper bits region and a lower bits region, said lower bits region of said decoder being connected to said lower bits region of the instruction counter means for holding said lower bits of said data addressing information.

3. In a data processing system as set forth in claim 2, wherein said providing means includes an upper bits specifying register connected between said processing unit and said upper bits region of said address decoder for holding said upper bits of said data addressing information during said read and write operations.

4. In a data processing system as set forth in claim 3, wherein said upper bits specifying register comprises a shift register and a buffer register connected thereto, said shift register receiving said upper bits of said data addressing information serially bit by bit from said processing unit and said buffer register applying said upper bits of said data addressing information to said upper bits region of said address decoder.

5. In a data processing system as set forth in claim 4, wherein said buffer register is controlled by a latch signal which is supplied sequentially from said instruction counter means and which commands said buffer register to receive said upper bits of said data addressing information stored in said shift register.

6. In a data processing system as set forth in claim 1, wherein said instruction counter means comprises a binary counter having output bit stages, and said instruction means comprises an address decoder having input bit stages and a memory connected thereto, said system including switching gate means for applying the outputs of said output bit stages of said binary counter to the corresponding input bit stages of said address decoder, said switching gate means changing the connection between said output bit stages of said binary counter and said corresponding input bit stages of said address decoder in accordance with the difference between the number of bits of said data word and the number of bits of said instruction word.

7. In a data processing system as set forth in claim 6, said switching gate means including means for applying a timing control signal to said instruction means.

8. In a data processing system as set forth in claim 1 wherein said instruction counter means comprises a binary counter, said system including means for applying a timing control signal to said data memory unit in accordance with the difference between the number of bits of said data word and the number of bits of said instruction word.

9. In a data processing system as set forth in claim 5, wherein said instruction counter means comprises a binary counter having a plurality of output bit stages including upper output bit stages and lower output bit stages, said system including means for producing said latch signal from a selected one of the lower output bit stages of said output bit stages of said binary counter.

10. A data processing system for addressing stored data words in accordance with data addressing inputs comprising upper bits and lower bits, and for processing said data words in accordance with stored instruction words addressable in accordance with instruction addressing inputs comprising upper bits and lower bits, said system comprising:

instruction means having a lower bits region for holding a plurality of bits comprising both said lower bits of said instruction addressing inputs and said lower bits of said data addressing inputs, and having an upper bits region for holding said upper bits of said instruction addressing inputs, addressing means responsive to receipt of said upper and lower bits of said instruction addressing inputs from said instruction means for retrieving and providing corresponding said stored instruction words, further addressing means responsive to receipt of said lower bits of said data addressing inputs from said instruction means, and to said upper bits of said data addressing inputs, for reading out and providing corresponding said stored data words, processing means for processing said data words provided by said further addressing means in accordance with said instruction words provided by said addressing means, whereby to provide further data words for storage, said processing means including providing means for providing said upper bits of said data addressing information as an output thereof, said instruction means providing said lower bits of data addressing information as an output thereof in synchronization with said providing means providing said upper bits of said data addressing information as an output thereof, whereby said lower bits of said instruction addressing information and said data addressing information, respectively, are provided by a common source, and memory means responsive to receipt of said lower bits of said data addressing inputs from said instruction means, and to receipt of said upper bits output of said data addressing information from said providing means, for selectivey reading said stored data words and storing said further data words, whereby said data processing system performs both instruction-addressing and data-addressing in synchronization, one with the other, with resultant improved efficiency.

11. The system of claim 10 wherein said instruction means comprises an instruction counter for providing said instruction addressing inputs and having a plurality of lower bit stages for producing said lower bits of said instruction addressing inputs and corresponding said lower bits of said data addressing inputs.

12. The system of claim 11 wherein said instruction means further comprises an instruction memory, and connecting means for connecting said instruction counter to said instruction memory for providing said instruction addressing inputs thereto, said instruction addressing inputs comprising a plurality of instruction addressing bits, said connecting means being responsive to a control command signal from said processing means for selectively shifting said plurality of instruction addressing bits by at least one bit prior to provision to said instruction register memory.

13. The system of claim 11 wherein said instruction means further comprises means connecting said instruction counter to said memory means and responsive to a control command signal from said processing means for selectively shifting said lower bits of said data addressing input prior to provision of said lower bits of said data addressing input to said memory means.

14. The system of claim 10 wherein said instruction words and said data words are the same length.

15. The system of claim 10 wherein said instruction words and said data words are of different lengths, said system further comprising means connecting said instruction means to said memory means, and responsive to a control command signal from said processing means for selectively shifting said lower bits of said data addressing inputs provided to said memory means.

16. The system of claim 10 wherein said instruction words and said data words are of different lengths, said instruction means including means responsive to a control command signal from said processing means for selectively shifting said lower bits of said instruction addressing inputs prior to provision of said lower bits of said instruction addressing input to said processing means.

17. The system of claim 10 wherein said processing means includes means for generating random bits and providing said random bits to said providing means, whereby to partially define stored data words to be addressed, and wherein said providing means comaprises a serial-to-parallel converting register for receiving said random bits from said generating means and for providing said random bits to said memory means as said upper bits of said data addressing information in synchronization with provision of said lower bits of said data addressing information to said memory means by said instruction means.

18. The system of claim 17 wherein said memory means comprises an address decoder for receiving said upper bits from said providing means and said lower bits from said instruction means for decoding same to produce a decoded addressing input indicating a given data word of said stored data words, and a memory responsive to said decoded addressing input for providing said given data word of said stored data words to said processing means.

19. The system of claim 10 wherein said memory means comprises an address decoder for receiving said upper bits from said providing means and said lower bits from said instruction means for decoding same to produce a decoded addressing input indicating a given data word of said stored data words, and a memory responsive to said decoded addressing input for providing said given data word of said stored data words to said processing means.

20. In the system of claim 10, wherein said means for providing said upper bits of said data address information comprises means for generating random bits.

21. In the system of claim 19, wherein said means for providing said upper bits of said data address information comprises means for generating random bits.

* * * * *

UNITED STATES PATENT AND TRADEMARK OFFICE
CERTIFICATE OF CORRECTION

PATENT NO. : 4,194,243
DATED : March 18, 1980
INVENTOR(S) : Toshitaka Tsuda

It is certified that error appears in the above—identified patent and that said Letters Patent is hereby corrected as shown below:

Abstract, line 4, delete "is";

Abstract, line 20, "addressinginformation" should be --addressing information--;

Col. 1, line 20, after "or" insert --the--;

Col. 1, line 21, delete "the";

Col. 1, line 58, after "that" insert --,--;

Col. 4, line 21, after "where" insert --,--;

Col. 4, line 33, after "length of" insert --M--;

Col. 4, line 40, after "$4(2^m$" insert --,--;

UNITED STATES PATENT AND TRADEMARK OFFICE
CERTIFICATE OF CORRECTION

PATENT NO. : 4,194,243
DATED : March 18, 1980
INVENTOR(S) : Toshitaka Tsuda

It is certified that error appears in the above—identified patent and that said Letters Patent is hereby corrected as shown below:

Col. 5, line 19, after "bits" insert --,--;

Col. 5, line 22, after "bits" insert --,--;

Col. 5, line 49, after "while" insert --,--;

Col. 5, line 50, "informaton" should be --information--;

Col. 6, line 64, after "LSB" insert --,--;

Col. 8, line 10, after "two" insert --bits--;

Col. 8, line 49, "15" should be --14--;

Col. 9, line 17, "accodance" should be --accordance--;

Col. 9, line 29, delete "are";

UNITED STATES PATENT AND TRADEMARK OFFICE
CERTIFICATE OF CORRECTION

PATENT NO. : 4,194,243

DATED : March 18, 1980

INVENTOR(S) : Toshitaka Tsuda

It is certified that error appears in the above—identified patent and that said Letters Patent is hereby corrected as shown below:

```
Col. 9, line 35, after "FIG. 6" insert --,--;

Col. 10, line 1, "terminal" should be --terminals--;

Col. 10, line 14, "be" should be --b3--;

Col. 10, line 17, "instructor" should be --instruction--;

Col. 10, line 34, "L5" should be --Lt--;

Col. 10, line 50, "FIG. 8." should be --FIG 8).--;

Col. 10, line 51, after "a" insert --shift--;

Col. 11, line 12, "83" should be --86--;

Col. 11, line 16, "utilizng" should be --utilizing--;

Col. 11, line 17, "L5'" should be --Lt'--;

Col. 11, line 27, "L5" should be --Lt--;
```

UNITED STATES PATENT AND TRADEMARK OFFICE
CERTIFICATE OF CORRECTION

PATENT NO. : 4,194,243

DATED : March 18, 1980

INVENTOR(S) : Toshitaka Tsuda

It is certified that error appears in the above—identified patent and that said Letters Patent is hereby corrected as shown below:

Col. 11, line 33, "shaft" should be --shift--;

Col. 11, line 62, "prior art" should be --"prior art"--;

Col. 11, line 65, "prior art" should be --"prior art"--;

Col. 12, line 9, ":" should be --;--;

Col. 14, line 41, delete "said";

Col. 14, line 53, delete "register".

Signed and Sealed this

Sixth Day of January 1981

[SEAL]

Attest:

SIDNEY A. DIAMOND

*Attesting Officer*  *Commissioner of Patents and Trademarks*